United States Patent
Wada et al.

(10) Patent No.: US 6,937,630 B2
(45) Date of Patent: Aug. 30, 2005

(54) LASER OSCILLATION METHOD AND LASER DEVICE

(75) Inventors: Satoshi Wada, Wako (JP); Takayo Ogawa, Wako (JP); Hideo Tashiro, Wako (JP); Hiroshi Machida, Sendai (JP); Mikio Higuchi, Kitahiroshima (JP); Kohei Kodaira, Sapporo (JP); Tomohiro Shonai, Sapporo (JP)

(73) Assignees: Riken, Saitama (JP); NEC Tokin Corporation, Miyagi (JP); Megaopto Co., Ltd., Saitama (JP)

( * ) Notice: Subject to any disclaimer, the term of this patent is extended or adjusted under 35 U.S.C. 154(b) by 0 days.

(21) Appl. No.: 10/237,678

(22) Filed: Sep. 10, 2002

(65) Prior Publication Data

US 2003/0147444 A1 Aug. 7, 2003

(30) Foreign Application Priority Data

Feb. 1, 2002 (JP) .................................... 2002-026066

(51) Int. Cl.$^7$ ................................................ H01S 3/14
(52) U.S. Cl. .............................. 372/39; 372/41; 372/69
(58) Field of Search .............................. 372/41, 39, 98

(56) References Cited

U.S. PATENT DOCUMENTS

| | | | |
|---|---|---|---|
| 5,140,604 A | * 8/1992 | Alablanche et al. | 372/41 |
| 5,418,808 A | * 5/1995 | Katoh et al. | 372/41 |
| 5,574,740 A | * 11/1996 | Hargis et al. | 372/41 |
| 5,751,751 A | * 5/1998 | Hargis et al. | 372/41 |
| 2001/0022794 A1 | 9/2001 | Urata et al. | |

OTHER PUBLICATIONS

Shonai et al., High–speed float zone growth of heavily Nd–doped YVO4 single crystals in Journal of Crystal Growth 2001, pp. 477–482.*

Lavi et al. ,Efficient pumping scheme for neodymium–doped materials by direct excitation of the upper lasing level in Applied Optics/vol. 38, No. 36/Dec. 20 1999).*

Shonai et al., "Float zone growth and laser performance of Nd:GdV0$_4$ single crystals", Journal of Crystal Growth Elsevier Netherlands, vol. 241, No. 1–2, pp. 159–164, (May 2002), XP004358331.

Lupei et al., "Highly efficient laser emission in concentrated Nd:YV0$_4$ components under direcet pumping into the emitting level", Optics Communications, North–Holland Publishing Co., NL, vol. 201, No. 4–6, pp. 431–435 (Jan. 15, 2002), XP004334665.

Shonai et al., "High–speed float zone growth of heavily Nd–doped YV0$_4$ single crystals" Journal of Crystal Growth Elsevier Netherlands, vol. 233, No. 3, pp. 477–482, (Dec. 2001), XP004305547.

Zhang et al., "Characterization of the laser crystal Nd:GdV0$_4$", Journal of the Optical Society of America B (Optical Physics) OPT. Soc. America USA, vol. 19, No. 1, pp. 18–27, (Jan. 2002), XP002313881.

Liu et al . et al., "High–power CW Nd:GdV0$_4$ solid–state laser end–pumped by a diode–laser–array", Optics Communications, North–Holland Publishing Co., Amsterdam, NL, vol. 164, No. 4–6, pp. 199–202, (Jun. 15, 1999), XP004169960.

Shonai, Tomohiro et al., "Preparation of thin Nd–doped YVO4 single crystal rods by the floating zone method," Materials Research Bulliten, vol. 35, 2000, pp. 225–232.

* cited by examiner

*Primary Examiner*—Minsun Oh Harvey
*Assistant Examiner*—Dung Nguyen
(74) *Attorney, Agent, or Firm*—Birch, Stewart, Kolasch & Birch, LLP (57) ABSTRACT

To provide a laser oscillation method and a laser device, which use a laser medium such as an Nd:GdVO$_4$ crystal to which neodymium is doped in high concentration exceeding 1% in atomicity ratio, the laser medium comprised of the gadolinium-vanadate crystal to which neodymium as laser active ion is doped by a floating zone method such that concentration becomes exceeding 1% in atomicity ratio.

29 Claims, 5 Drawing Sheets

INPUT/OUTPUT CHARACTERISTICS OF GdVO4 CRYSTAL TO WHICH Nd IS DOPED BY 5%

LASER OSCILLATION METHOD AND LASER DEVICE

BACKGROUND OF THE INVENTION

1. Field of the Invention

The present invention relates to a laser oscillation method and a laser device, and more particularly to a laser oscillation method and a laser device suitable for using in fabricating a laser medium that is pumped by pumping light to perform laser oscillation.

2. Description of the Related Art

Conventionally, usefulness of a neodymium doped gadolinium-vanadate (hereinafter, referred to as 'Nd:GdVO$_4$' accordingly) crystal, which is a gadolinium-vanadate (GdVO$_4$) crystal to which neodymium (Nd) as laser active ion has been added (hereinafter, referred to as 'doped' accordingly), as a laser medium has been expected.

However, fabrication of the Nd:GdVO$_4$ crystal is difficult, crystal growth of the Nd:GdVO$_4$ crystal is currently performed only on a research level, and it has rarely been commercially produced.

On the other hand, it has been pointed out that the Nd:GdVO$_4$ crystal that is on production and sold has doping concentration of neodymium at 1% or less in the atomicity ratio, that is, low doping concentration of neodymium. Further, it has not guaranteed sufficient optical characteristics.

For this reason, when it is compared with a neodymium doped yttrium-aluminum-garnet (hereinafter, referred to as 'Nd:YAG' accordingly) crystal and a neodymium doped yttrium-vanadate (hereinafter, referred to as 'Nd:YVO$_4$' accordingly), which have the same laser oscillation wavelength region as that of the Nd:GdVO$_4$ crystal and currently hold a dominant share of the market as a solid state laser medium, the Nd:GdVO$_4$ crystal has not completely made full use of its advantage nor has it been dominant in the market yet.

Furthermore, since it has conventionally been difficult to dope neodymium as laser active ion in high concentration exceeding 1% in atomicity ratio when fabricating the Nd:GdVO$_4$ crystal, laser oscillation pumped by pumping light in a wavelength band other than the wavelength of 808 nm, which is the main absorption band of the Nd:GdVO$_4$ crystal, has not been put into practical use until now.

In other words, since the Nd:GdVO$_4$ crystal currently sold in the market, whose doping concentration of neodymium is low, has low absorption level of pumping light totally, it is difficult to be pumped in a wavelength band other than the main absorption band that is the wavelength of 808 nm. Therefore, even if it is pumped to perform laser oscillation, efficiency is poor due to small absorbable energy and thus output has not been effectively obtained.

For this reason, proposal of the followings has been strongly desired: a fabrication method of the Nd:GdVO$_4$ crystal as a laser medium to which neodymium is doped in high concentration exceeding 1% in atomicity ratio; a laser oscillation method that uses the Nd:GdVO$_4$ crystal, to which neodymium is doped in high concentration exceeding 1% in atomicity ratio, as the laser medium; and a laser device that uses that uses the Nd:GdVO$_4$ crystal, to which neodymium is doped in high concentration exceeding 1% in atomicity ratio, as the laser medium.

It is to be noted that, in this specification, the Nd:GdVO$_4$ crystal to which neodymium as laser active ion is doped in high concentration exceeding 1% in atomicity ratio is simply referred to as a 'highly concentrated Nd doped GdVO$_4$ crystal' or a 'highly concentrated Nd:GdVO$_4$ crystal', accordingly.

Further, due to the same background as the foregoing, proposal of the followings has also been strongly desired: a fabrication method of single crystal as the laser medium to which Tm, Ho, Er or Cr ion as laser active ion is doped in high concentration, such as Tm:YVO$_4$ and TM:GdVO$_4$, for example; a laser oscillation method using the single crystal as the laser medium; and a laser device using the single crystal as the laser medium.

OBJECTS AND SUMMARY OF THE INVENTION

The present invention has been made in view of the above-described demands to the prior arts, and an object of the invention is to provide the laser oscillation method and the laser device, which use the laser medium comprised of the crystal to which laser active ion is doped in a predetermined concentration.

In order to achieve the above-described object, the laser oscillation method where the pumping light pumps the laser medium to perform laser oscillation according to the present invention utilizes the laser medium comprised of the gadolinium-vanadate crystal to which neodymium as laser active ion is doped by a floating zone method such that concentration becomes 2% to 15% in atomicity ratio.

Further, the present invention is the laser oscillation method where the pumping light pumps the laser medium to perform laser oscillation, in which pumping of the pumping light in a wavelength band different from a wavelength band, which is the main absorption band, performs laser oscillation to the laser medium comprised of a crystal to which laser active ion is doped in a predetermined concentration, which is fabricated by the floating zone method.

Further, the present invention is the laser oscillation method where the pumping light pumps the laser medium to perform laser oscillation, in which pumping of the pumping light in a wavelength band different from the wavelength band of 808 nm, which is the main absorption band, performs laser oscillation to the laser medium comprised of the gadolinium-vanadate crystal to which neodymium as laser active ion is doped such that concentration exceeds 1% in atomicity ratio.

Furthermore, the present invention is the laser oscillation method where the pumping light pumps the laser medium to perform laser oscillation, in which pumping of the pumping light in a wavelength band different from the wavelength band of 808 nm, which is the main absorption band, performs laser oscillation to the laser medium comprised of gadolinium-vanadate crystal to which neodymium as laser active ion is doped such that concentration becomes 2% to 15% in atomicity ratio.

Further, the present invention is the laser oscillation method, in which the pumping light of the wavelength band of 880 nm is used as the pumping light in the wavelength band different from the wavelength band of 808 nm, which is the main absorption band.

It is to be noted that pumping light near 880 nm provides excitation of Nd ion from ground state to $^4F_{3/2}$ line of Nd ion.

Furthermore, the present invention is the laser device where the laser medium is arranged in a resonator, pumping light is made incident in the laser medium to generate laser oscillation in the resonator, and laser beam is made exit from the resonator, in which the laser medium is a laser medium comprised of the crystal to which laser active ion is doped in a predetermined concentration, which is fabricated by the floating zone method.

Still further, the present invention is the laser device where the laser medium is arranged in the resonator, pumping light is made incident in the laser medium to generate laser oscillation in the resonator, and laser beam is made exit from the resonator, in which the laser medium is the gadolinium-vanadate crystal to which neodymium as laser active ion is doped such that concentration exceeds 1% in atomicity ratio.

Further, the present invention is the laser device, in which the laser medium is one to which the neodymium is doped such that concentration becomes 2% to 15% in atomicity ratio.

Further, the present invention is the laser device, in which pumping of the pumping light in the wavelength band different from the wavelength band of 808 nm, which is the main absorption band, performs laser oscillation to the laser medium.

Further, the present invention is the laser device, in which the pumping light of the wavelength band of 880 nm is used as the pumping light in the wavelength band different from the wavelength band of 808 nm that is the main absorption band.

Still further, the present invention is the laser device, in which the pumping light is made incident by semiconductor laser pumping.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, one example of a preferred embodiment of a laser oscillation method and a laser device according to the present invention will be described in detail by referring to the accompanying drawings.

Figure 1:
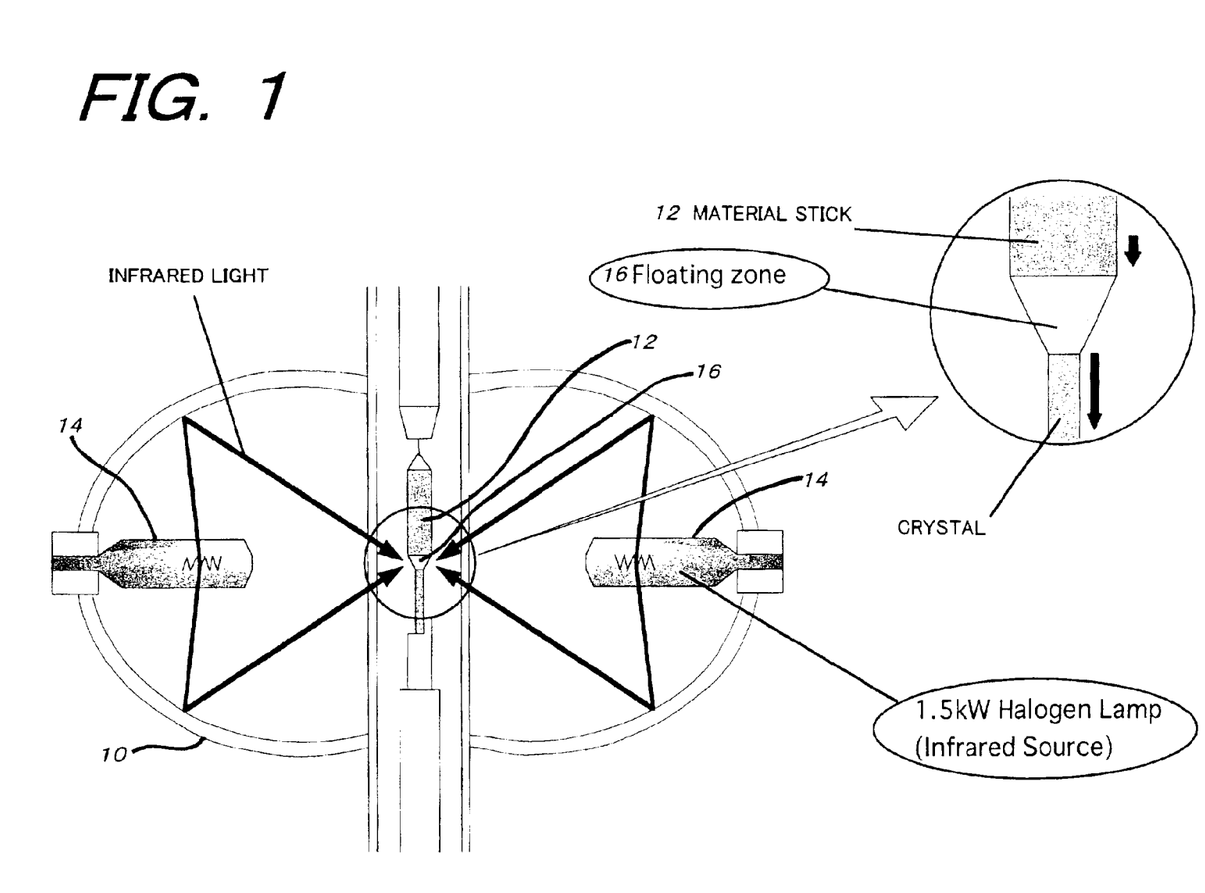
FIG. 1 is a schematic view of the floating zone method (referred to as a 'FZ method' in this specification accordingly) that is a method for fabricating the laser medium according to an embodiment of the present invention.

Firstly, FIG. 1 shows the schematic view of the floating zone method (referred to as the 'FZ method' in this specification accordingly) that is the method for fabricating the laser medium according to an embodiment of the present invention.

Specifically, in the present invention, the method referred to as the FZ method fabricates the laser medium such as the highly concentrated Nd doped $GdVO_4$ crystal or $Tm:YVO_4$ and $TM:GdVO_4$, which are the single crystal to which Tm, Ho, Er or Cr ion as laser active ion is doped in a predetermined concentration.

Herein, the FZ method is a method in which infrared light from a halogen lamp 14 as an infrared source is made focus on a material stick 12 to melt it, which has been sintered under a high temperature and a high pressure, a floating zone 16 is formed between a seed crystal and the material stick 12, and thus forming the crystal by moving the floating zone 16 in one direction, in a furnace 10.

Therefore, when fabricating the highly concentrated Nd doped $GdVO_4$ crystal, the material stick 12 produced by sintering neodymium, gadolinium and vanadate under the high temperature and the high pressure is prepared first. Next, the infrared light from the halogen lamp 14 is made focus on the material stick 12 to melt it, the floating zone 16 is formed between the seed crystal and the material stick 12, and the highly concentrated Nd doped $GdVO_4$ crystal is thus formed by moving the floating zone 16 in one direction.

According to the FZ method, the highly concentrated Nd doped $GdVO_4$ crystal to which neodymium as laser active ion is doped such that concentration exceeds 1% in atomicity ratio can be obtained as the highly concentrated Nd doped $GdVO_4$ crystal, for example, and the highly concentrated Nd doped $GdVO_4$ crystal to which neodymium as laser active ion is doped such that concentration becomes 2% to 15% in atomicity ratio could be obtained, for example.

It is to be noted that the above-described concentration can be controlled to an arbitrary concentration by sintering Nd of a predetermined concentration to the material stick 12.

Further, according to the FZ method, the highly concentrated Nd doped $GdVO_4$ crystal with a diameter of 3 mm and a length of 50 mm, for example, could be fabricated.

A halogen lamp with an output of 1.5 kW can be used as the halogen lamp 14 that irradiates the infrared light to the material stick.

Incidentally, a pulling method such as the Czochralski method (referred to as a 'Cz method' in this specification accordingly) has conventionally been used in fabricating the Nd doped $GdVO_4$ crystal.

However, since the Nd doped $GdVO_4$ crystal has a characteristic that a melting point of vanadate being the material is as high as about 1700° C., a crucible and growth atmosphere are limited and it has been difficult to fabricate the highly concentrated Nd doped and good quality crystal.

For this reason, in the conventional low concentration Nd doped $GdVO_4$ crystal to which neodymium is doped such that concentration is 1% or less in atomicity ratio, a peak of the absorption coefficient where laser oscillation can be performed only exited in the main absorption band of 808 nm wavelength band. Accordingly, it has been necessary that the laser was pumped by the pumping light from a laser diode having an oscillation wavelength of 808 nm, which was tuned to the main absorption band of 808 nm wavelength band, in order to perform laser oscillation by using the conventional low concentration Nd doped $GdVO_4$ crystal to which neodymium is doped such that concentration is 1% or less in atomicity ratio as the laser medium.

On the other hand, since the FZ method according to the present invention does not use the crucible nor the growth atmosphere is limited, the limitation of the crucible and the growth atmosphere that has been the conventional problem has been solved and growth of the crystal of high concentration and good quality has become possible.

As a result, although the highly concentrated Nd doped $GdVO_4$ crystal has the main absorption band with the maximum peak of absorption coefficient in 808 nm wavelength band, it also has other absorption bands with a peak of absorption coefficient where laser oscillation can be performed near the band. Therefore, in the highly concentrated Nd doped $GdVO_4$ crystal fabricated by the present invention, generation of laser oscillation has become possible even by using the pumping light of an oscillation wavelength tuned to an absorption band other than the main absorption band.

Incidentally, an output larger than the ratio between a wavelength of incident light and a wavelength of outgoing light (quantum conversion efficiency) cannot be obtained in laser.

When the highly concentrated Nd doped $GdVO_4$ crystal fabricated by the present invention is used as the laser medium, a wavelength of an pumping light where the quantum conversion efficiency can be made maximum can be selected from a plurality of absorption bands even in the case of oscillating light of the same wavelength, and highly efficient oscillation can be performed.

Figure 2:
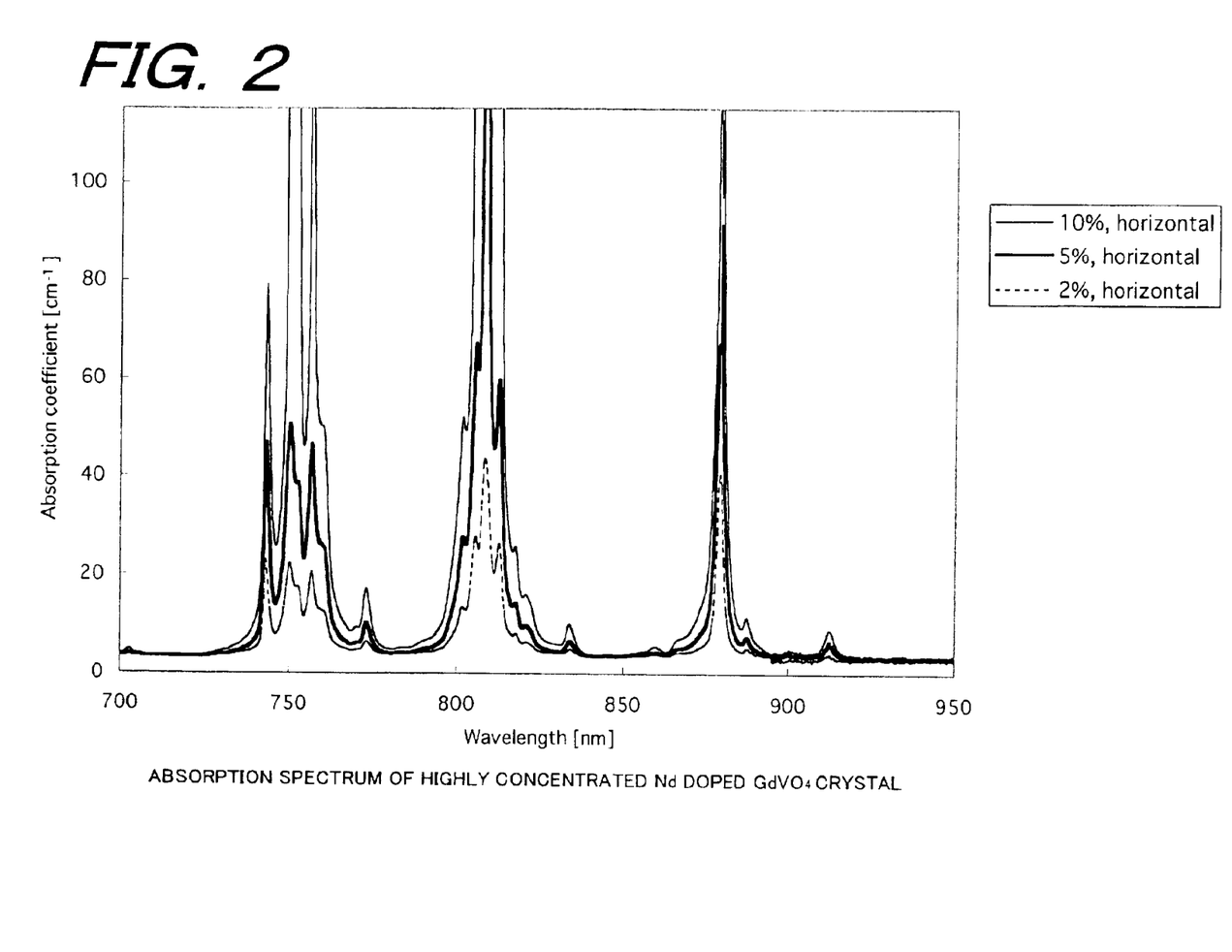
FIG. 2 is a graph showing an experimental result by the inventors of this application, which is a graph showing a measurement result of absorption spectrum regarding the highly concentrated Nd doped $GdVO_4$ crystal according to the present invention whose neodymium concentration is 2%, 5% and 10%, that is, three kinds of crystals having atomicity ratio of neodymium at 2%, 5% and 10%. It is to be noted that the axis of abscissas shows the wavelength in the unit of 'nm' , and the axis of ordinates shows an absorption coefficient in the unit of '$cm^{-1}$'.

Herein, FIG. 2 shows the graph showing the measurement result of absorption spectrum regarding the highly concentrated Nd doped $GdVO_4$ crystal fabricated by the FZ method, whose neodymium concentration is 2%, 5% and 10%, that is, three kinds of crystals having atomicity ratio of neodymium at 2%, 5% and 10%. It is to be noted that the axis of abscissas shows the wavelength in the unit of 'nm', and the axis of ordinates shows an absorption coefficient in the unit of '$cm^{-1}$' in FIG. 2.

As it is clear from FIG. 2, the absorption of the pumping light sharply increases as the concentration of neodymium doped becomes higher. For example, in the highly concentrated Nd doped $GdVO_4$ crystal whose neodymium concentration doped is 5%, the absorption coefficient is 100 $cm^{-1}$ or more at 808 nm.

Furthermore, as shown in FIG. 2, in the highly concentrated Nd doped $GdVO_4$ crystal, there exist the absorption band having a peak around the wavelength of 750 nm and the absorption band having a peak around the wavelength of 880 nm as the absorption bands where laser oscillation can be performed other than the main absorption band of the wavelength of 808 nm is generally used for pumping by the laser diode.

When attention is paid to the absorption band having a peak around the wavelength of 880 nm, the quantum conversion efficiency during pumping in the absorption band of the wavelength of 880 nm is 0.83 (880/1060=0.83) that has increased by about 10% comparing to the quantum conversion efficiency during pumping in the absorption band of the wavelength of 808 nm, which is 0.75 (808/1060=0.75), and thus preventing reduction of output caused by transformation of a loss for that amount into heat.

Figure 3:
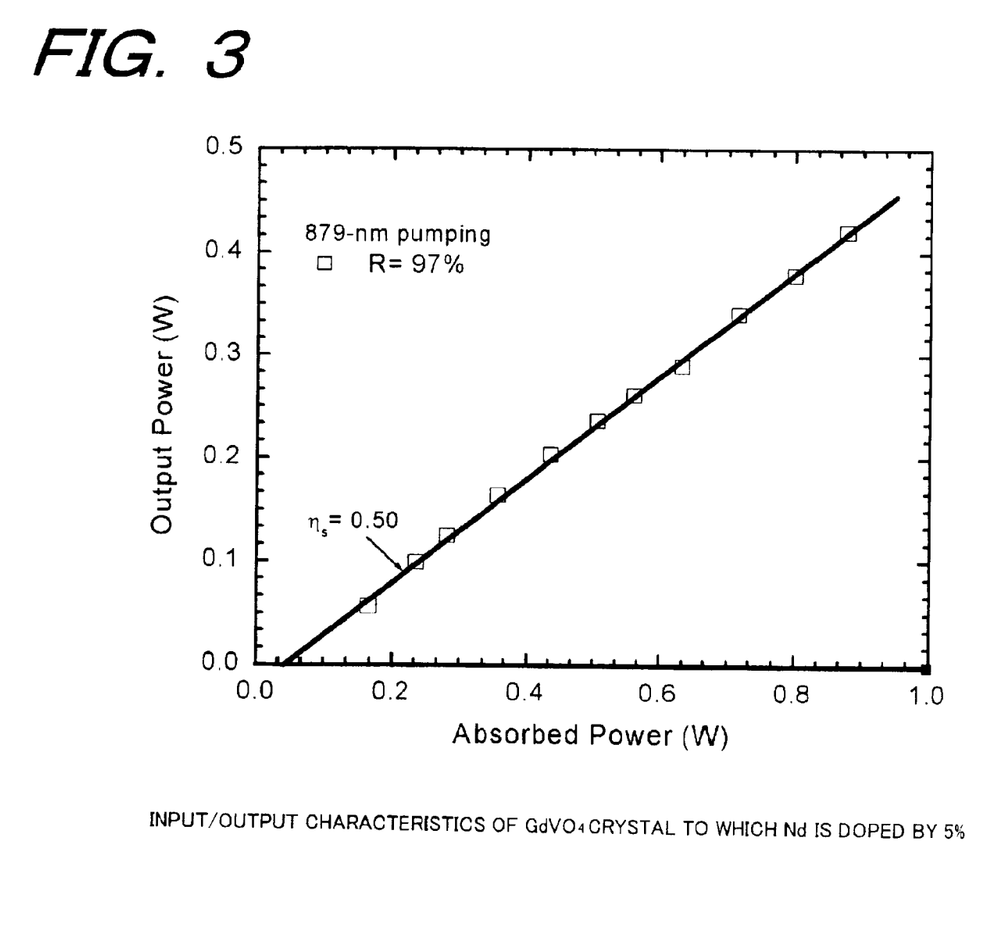
FIG. 3 is a graph showing an experimental result by the inventors, which is a graph of input/output characteristics when the highly concentrated Nd doped $GdVO_4$ crystal to which neodymium is doped by 5% in atomicity ratio was used as the highly concentrated Nd doped $GdVO_4$ crystal in the laser device shown in FIG. 4. It is to be noted that the axis of abscissas shows an absorbed power in the unit of 'W', and the axis ordinates shows an output power in the unit of 'W'.

FIG. 3 shows the experimental result when the highly concentrated Nd doped $GdVO_4$ crystal having neodymium concentration, that is, to which neodymium is doped by 5% in atomicity ratio using the laser device of the present invention, which will be described later referring to FIG. 4. It is to be noted that the axis of abscissas shows the absorbed power in the unit of 'W', and the axis ordinates shows the output power in the unit of 'W'.

Next, description will be made for the laser device that is comprised by using the highly concentrated Nd doped $GdVO_4$ crystal, to which neodymium as laser active ion is doped in concentration exceeding 1% in atomicity ratio, as the laser medium, such as the highly concentrated Nd doped $GdVO_4$ crystal to which neodymium is doped by 2%, 5% and 10% in atomicity ratio.

Figure 4:
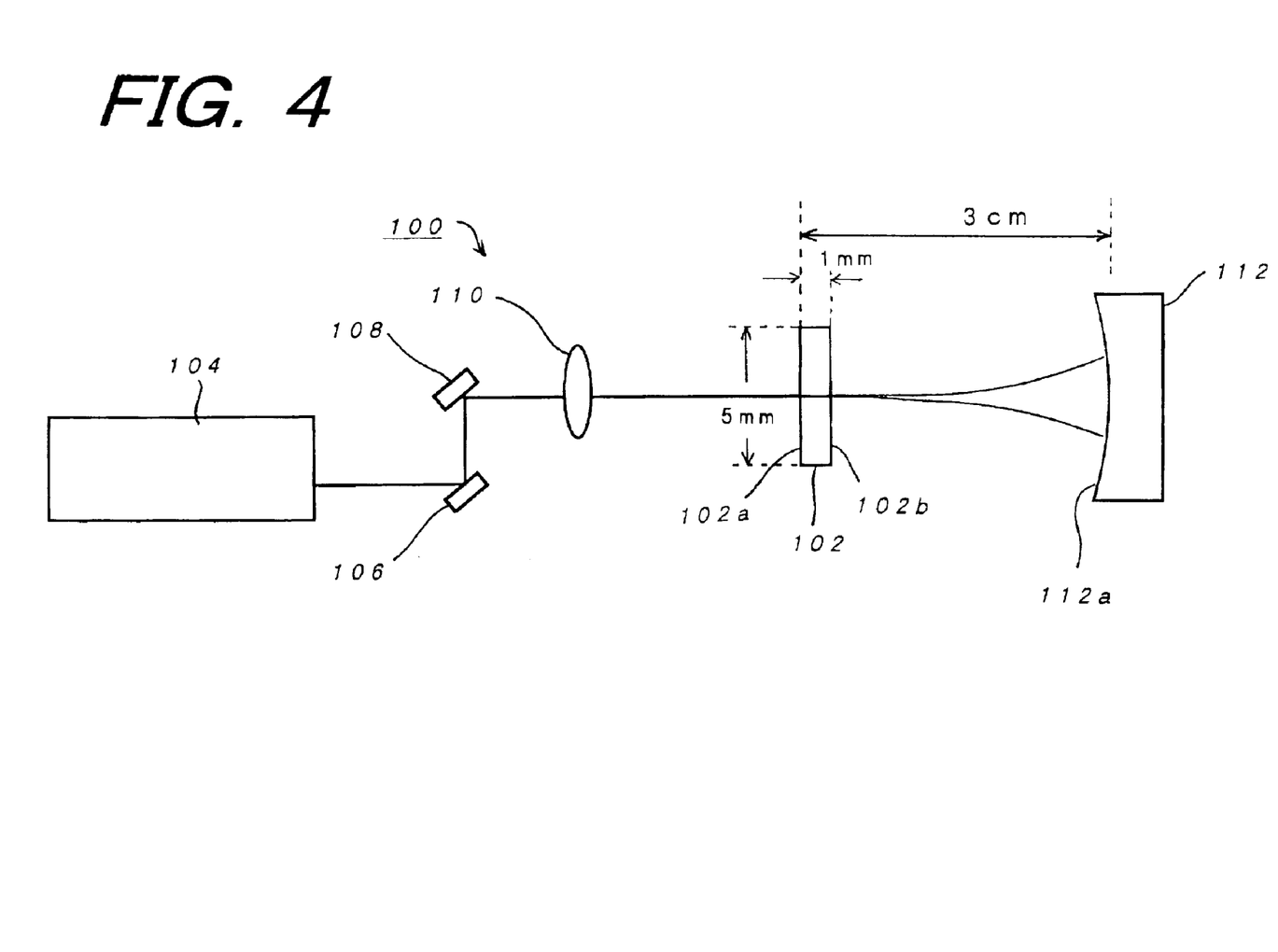
FIG. 4 is a schematic configuration explanatory view showing a laser device to perform a pulse oscillation operation among laser devices that use the highly concentrated Nd doped $GdVO_4$ crystal as the laser medium.

Firstly, FIG. 4 shows the laser device to perform the pulse oscillation operation among laser devices that use the highly concentrated Nd doped $GdVO_4$ crystal as the laser medium.

A laser device 100 shown in FIG. 4 is comprised of a highly concentrated Nd doped $GdVO_4$ crystal 102 as the laser medium, a titanium-sapphire laser 104 for generating the pumping light, total reflection mirrors (106, 108), a condenser lens 110 and an output mirror 112.

Herein, the titanium-sapphire laser 104 is a pumping laser as a pumping source for generating the pumping light to cause the pulse oscillation operation, which is a titanium-sapphire laser having the wavelength of 880 nm, the maximum output power of 40 mW in average, and a pulse width of 80 ns with 1 kHz repeating frequency.

Further, the highly concentrated Nd doped $GdVO_4$ crystal 102 is cut into the size of 5 mm(length)×5 mm(width)×1 mm(depth), a first surface 102a opposing to the titanium-sapphire laser 104 is coated so as to totally reflect light having the wavelength of 1063 nm and to make no reflection to light with the wavelength of 880 nm, and a second surface 102b opposing to the output mirror 112 is coated so as to make no reflection to light with the wavelength of 1063 nm.

Moreover, in the output mirror 112, a surface opposing to the highly concentrated Nd doped $GdVO_4$ crystal 102 is formed as a concave surface 112a with the radius of curvature of 50 mm and the other surface is formed as a flat surface 112b. Further, the concave surface 112a is coated so as to make reflectivity at 90% to the light having the wavelength of 1064 nm, which is constituted as a concave mirror. No coating is applied to the flat surface 112b.

It is to be noted that the condenser lens 110 is formed of fused quartz glass, which is designed to have the focal length of 100 mm.

Therefore, in the laser device 100, the first surface 102a and the concave surface 112a constitute a resonator, and the highly concentrated Nd doped $GdVO_4$ crystal 102 is arranged as the laser medium in the resonator. The cavity length of the resonator is set to 3 cm.

In the above-described structure, when the pumping light output from the titanium-sapphire laser 104 is made incident in the condenser lens 110 via the total reflection mirrors (106, 108), the condenser lens 110 focuses the pumping light to make it incident in the highly concentrated Nd doped $GdVO_4$ crystal 102.

With this procedure, laser oscillation is generated in the resonator and the laser beam is output from the flat surface 112b of the output mirror 112.

As described, FIG. 3 is the graph showing the experimental result by the inventors of this application, which shows the graph of output/input characteristics when the highly concentrated Nd doped $GdVO_4$ crystal to which neodymium is doped by 5% in atomicity ratio was used as the highly concentrated Nd doped $GdVO_4$ crystal 102 in the laser device 100 shown in FIG. 4.

Figure 5:
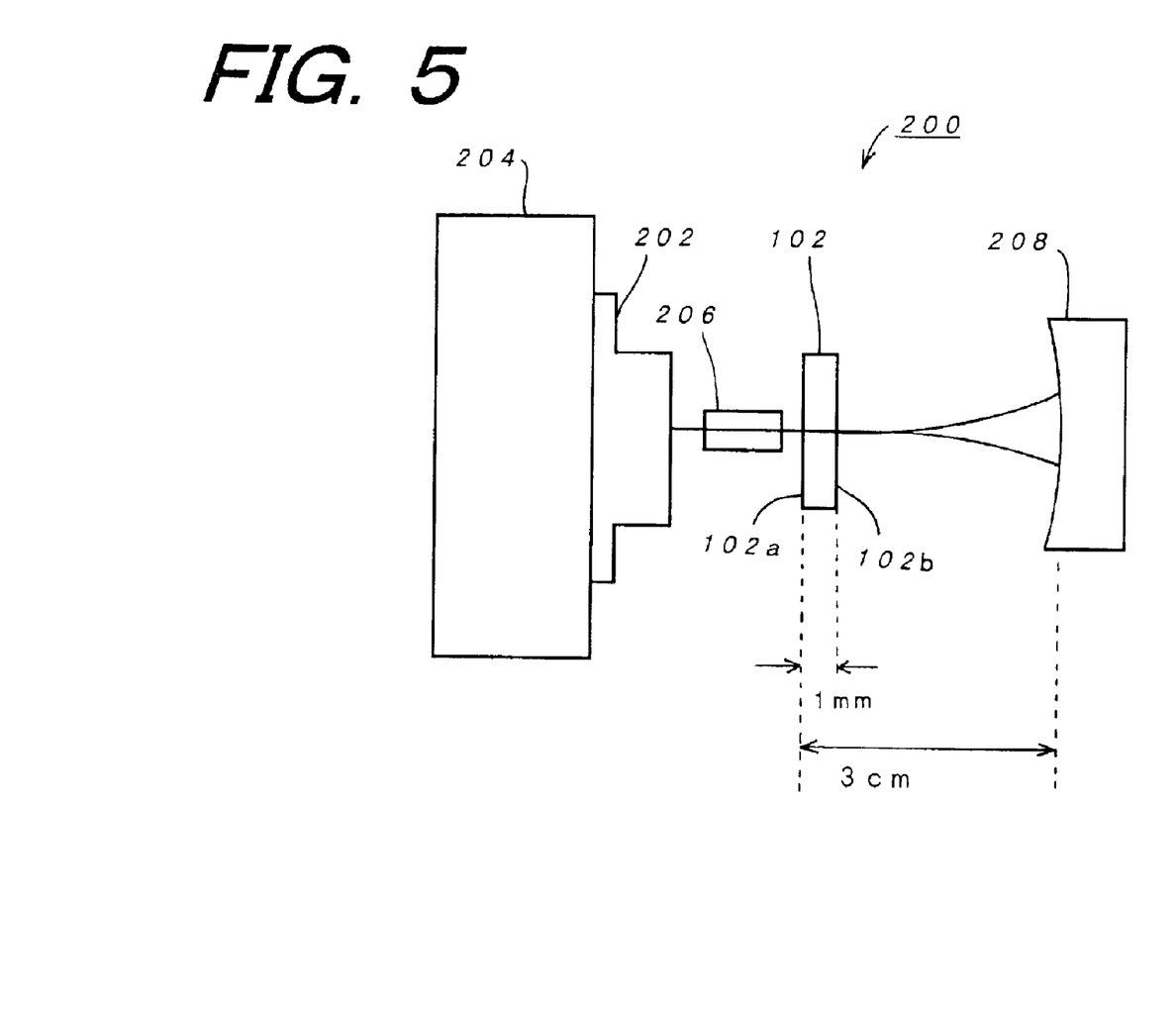
FIG. 5 is a schematic configuration explanatory view showing a laser device to perform a CW (continuous wave) oscillation operation among laser devices that use the highly concentrated Nd doped $GdVO_4$ crystal as the laser medium.

Next, FIG. 5 Shows the laser device to perform the CW (continuous wave) oscillation operation among laser devices that use the highly concentrated Nd doped $GdVO_4$ crystal as the laser medium. The laser device shown in FIG. 5 is constituted as a semiconductor laser (LD) pumped solid state laser device.

In the structure of the laser device shown in FIG. 5, reference numerals same as the ones used in FIG. 4 are used regarding the structure same as or corresponding to that of the laser device 100 shown in FIG. 4, and detail structure and description of operation thereof will be omitted.

A laser device 200 shown in FIG. 5 is comprised of the highly concentrated Nd doped $GdVO_4$ crystal 102 as the laser medium, a laser diode 202 as the pumping source for generating beam as the pumping light, a heat sink 204 for heating the laser diode 202, a gradient index lens 206 that focuses the beam as the pumping light, which is output from the laser diode 202, to the highly concentrated Nd doped $GdVO_4$ crystal 202 to make the beam incident therein and an output mirror 208.

Herein, the laser diode 202 is a single stripe laser diode of 200 μm of GaAs/GaAlAs, and its wavelength is 880 nm at 25° C. and the maximum output power is 2 W.

Further, the heat sink 204 is formed of a copper block, which is water-cooled.

Moreover, in the output mirror 208, a surface opposing to the highly concentrated Nd doped $GdVO_4$ crystal 102 is formed as a concave surface 208a with the radius of curvature of 750 mm and the other surface is formed as a flat surface 208b. Further, the concave surface 208a is coated so as to make reflectivity at 95% to the light having the wavelength of 1064 nm, which is constituted as a concave mirror. No coating is applied to the flat surface 208b.

It is to be noted that the gradient index lens 206 has the diameter of 1.8 mm.

Therefore, in the laser device 200, the first surface 102a and the concave surface 208a constitute a resonator, and the highly concentrated Nd doped $GdVO_4$ crystal 102 is arranged as the laser medium in the resonator. The cavity length of the resonator is set to 3 cm.

Still further, the semiconductor laser pumping in the laser device 200 is a end pumping where the pumping light is made incident in the highly concentrated Nd doped $GdVO_4$ crystal 102 as the laser medium from a direction that approximately matches an optical axis of the light reciprocating in the resonator by laser oscillation.

In the above-described structure, when the beam as the pumping light output from the laser diode 202 is made incident in the gradient index lens 206, the gradient index lens 206 focuses the beam to the highly concentrated Nd doped $GdVO_4$ crystal 102 and makes it incident therein.

With this procedure, laser oscillation is generated in the resonator and the laser beam is output from the flat surface 208b of the output mirror 208.

As described, by using the Nd:$GdVO_4$ crystal to which neodymium is doped in high concentration exceeding 1% in atomicity ratio, it has become possible that pumping is performed in the absorption bands in the wavelength bands other than the wavelength band of 808 nm, which is the main absorption band, to generate laser oscillation.

Specifically, since doping of neodymium in high concentration dramatically increases the absorption coefficient of the Nd:$GdVO_4$ crystal, pumping in a wavelength region having a small absorption coefficient is made possible, which has been difficult by the Nd:$GdVO_4$ crystal to which neodymium is doped in low concentration, which has been fabricated by the conventional technique.

Further, by performing pumping on selecting the absorption bands in the wavelength bands other than the wavelength band of 808 nm, which is the main absorption band using the Nd:$GdVO_4$ crystal to which neodymium is doped in high concentration exceeding 1% in atomicity ratio, improvement of the quantum conversion efficiency is made possible comparing to the pumping on selecting the wavelength band of 808 nm, which is the main absorption band, and thus highly efficient laser oscillation can be obtained.

Moreover, since pumping can be performed on selecting the absorption bands in the wavelength bands other than the wavelength band of 808 nm, which is the main absorption band, when the Nd:$GdVO_4$ crystal to which neodymium is doped in high concentration exceeding 1% in atomicity ratio is used, options for selecting an pumping light source widen although the pumping light source has conventionally been limited to the laser diode having the oscillation wavelength in 808 nm, which is the main absorption band.

It is to be noted that the above-described embodiments may be modified as explained in the following paragraphs (1) through (4).

(1) In the above-described embodiments, description has been made in detail for the case where neodymium was doped to the gadolinium-vanadate crystal in the concentration of 2%, 5% or 10% in atomicity ratio, but it is a matter of course that the present invention is not limited to this case. Concentration of neodymium doped to the gadolinium-vanadate crystal may be high concentration such as the concentration exceeding 1% in atomicity ratio, which is 2% or higher in concentration preferably, 5% or higher in concentration more preferably, and 2% to 15% in concentration further preferably.

(2) In the above-described embodiments, semiconductor laser pumping has been made by the end pumping, but it is a matter of course that the present invention is not limited to this. The laser diode pumping may be performed by a side pumping where the pumping light is made incident in the laser medium from a direction approximately perpendicular to the optical axis of the light reciprocating in the resonator by laser oscillation.

(3) In the above-described embodiments, description has been made for the gadolinium-vanadate crystal to which neodymium was doped in high concentration as the laser medium, but it is a matter of course that the laser medium for which the present invention can be applied is not limited to this. For example, the present invention can be applied for the single crystal as the laser medium to which Tm, Ho, Er or Cr ion as laser active ion is doped in high concentration, such as Tm:$YVO_4$ and TM:$GdVO_4$. It is preferable to control the concentration of the sintered body in such an occasion.

(4) The above-described embodiments and the modified examples described in the above paragraphs (1) through (3) may be used in combination appropriately.

Since the present invention has been constituted as described above, it exerts an excellent effect that the laser oscillation method and the laser device, which use the laser medium comprised of the crystal to which laser active ion is doped in a predetermined concentration.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure, of Japanese Patent Application No. 2002-26066 filed on Feb. 1, 2002 including specification, claims, drawings and summary are incorporated herein by reference in its entirety.

What is claimed is:

1. A laser oscillation method where pumping light pumps a laser medium to perform laser oscillation wherein:
said method utilizes the laser medium comprised of a gadolinium-vanadate crystal to which neodymium as laser active ion is doped by a floating zone method in a growth atmosphere without limits such that concentration becomes 2% to 15% in atomicity ratio, wherein the pumping light pumps in a wavelength band of 880 nm.

2. A laser oscillation method where pumping light pumps a laser medium to perform laser oscillation wherein:
pumping of the pumping light in a wavelength band of 808 nm, which is a main absorption band, performs said laser oscillation to said laser medium comprised of gadolinium-vanadate crystal to which neodymium as laser active ion is doped such that concentration exceeds 1% in atomicity ratio.

3. A laser oscillation method where pumping light pumps a laser medium to perform laser oscillation wherein:
pumping of the pumping light in a wavelength band of 808 nm, which is not a main absorption band, performs said laser oscillation to said laser medium comprised of a gadolinium-vanadate crystal to which neodymium as a laser active ion is doped such that a concentration becomes 2% to 15% in atomicity ratio.

4. A laser device where a laser medium is arranged in a resonator, a pumping light is made incident in said laser medium to generate laser oscillation in said resonator, and laser beam is made to exit from said resonator wherein:
said laser medium is comprised of a gadolinium-vanadate crystal to which neodymiun as a laser active ion is doped in a predetermined concentration, which is fabricated by a floating zone method in a growth atmosphere without limits, wherein the pumping light pumps in a wavelength band of 880 nm.

5. A laser device where a laser medium is arranged in a resonator, pumping light is made incident in said laser medium to generate laser oscillation in said resonator, and laser beam is made exit from said resonator wherein:
said laser medium is a gadolinium-vanadate crystal to which neodymium as laser active ion is doped such that a concentration exceeds 1% in atomicity ratio, and pumping of the pumping light in a wavelength band of 880 nm, which is not a main absorption band, performs said laser oscillation to said laser medium.

6. The laser device as claimed in claim 5 wherein:
said laser medium is one to which said neodymium is doped such that the concentration becomes 2% to 15% in atomicity ratio.

7. A laser device as claimed in claim 5 wherein:
said laser medium is one to which said neodymium is doped such that the concentration becomes 0.01% to 1% and exceeds 15% in atomicity ratio.

8. A laser device as claimed in claim 6 wherein:
pumping of the pumping light in a wavelength band different from the wavelength band of 808 nm, which is the main absorption band, performs laser oscillation to said laser medium.

9. A laser device as claimed in claim 6 wherein:
said laser medium is one to which said neodymium is doped such that the concentration becomes 0.01% to 1% and exceeds 15% in atomicity ratio.

10. A laser device as claimed in claim 8 wherein:
said pumping light in the wavelength band different from the wavelength band of 808 nm, which is the main absorption band, is the pumping light of the wavelength band of 880 nm.

11. The laser device as claimed in claim 4 wherein:
said pumping light is made incident by semiconductor laser pumping.

12. The laser device as claimed in claim 5 wherein:
said pumping light is made incident by semiconductor laser pumping.

13. The laser device as claimed in claim 6 wherein:
said pumping light is made incident by semiconductor laser pumping.

14. The laser device as claimed in claim 7 wherein:
said pumping light is made incident by semiconductor laser pumping.

15. The laser device as claimed in claim 8 wherein:
said pumping light is made incident by semiconductor laser pumping.

16. The laser device as claimed in claim 10 wherein:
said pumping light is made incident by semiconductor laser pumping.

17. A laser oscillation method where pumping light in a wavelength band of 880 nm, which is not a main absorption band, excites Nd ion from ground state to $^4F_{3/2}$ line of Nd ion, where the method utilizes a laser medium comprised of a gadolinium-vanadate crystal to which neodymium as a laser active ion is doped.

18. A laser oscillation method where pumping light pumps a laser medium to perform laser oscillation wherein:
pumping of the pumping light in a wavelength band of 880 nm, which is not a main absorption band, performs said laser oscillation to said laser medium comprised of gadolinium-vanadate crystal to which neodymium as a laser active ion is doped.

19. A laser device where a laser medium is arranged in a resonator, pumping light is made incident in said laser medium to generate laser oscillation in said resonator, and laser beam is made to exit from said resonator wherein:
said laser medium is gadolinium-vanadate crystal to which neodymium as a laser active ion is doped, and pumping of the pumping light in a wavelength band of 880 nm, which is not a main absorption band, performs said laser oscillation to said laser medium.

20. The laser oscillation method according to claim 1, wherein said method utilizes the laser medium comprised of a gadolinium-vanadate crystal to which neodymium as the laser active ion is doped by the floating zone method such that the concentration becomes 5% to 15% in atomicity ratio.

21. The laser device according to claim 4, wherein said crystal of said laser medium is doped with the laser active ion at a predetermined concentration of more than 5% to 15% in atomicity ratio.

22. The laser device according to claim 1, wherein said crystal of said laser medium is doped with the laser active ion at a predetermined concentration of 10% to 15% in atomicity ratio.

23. The laser device according to claim 4, wherein said crystal of said laser medium is doped with the laser active ion at a predetermined concentration of 10% to 15% in atomicity ratio.

24. The laser oscillation method according to claim 2, further comprising the step of:

doping the crystal of said laser medium with the laser active ion at the concentration of 10% to 15% in atomicity ratio.

25. The laser oscillation method according to claim 2, further comprising the step of:

doping the crystal of said laser medium with the laser active ion at the concentration of 2% to 5% in atomicity ratio, whereby an absorption coefficient of the light in the wavelength band of 880 nm is greater than the absorption coefficient of the light in the wavelength band 750 nm.

26. The laser oscillation method according to claim 2, further comprising the step of:

fabricating the crystal by a floating zone method in a growth atmosphere without limits.

27. The laser device according to claim 5, wherein the crystal of said laser medium is doped with the laser active ion at the concentration of 10% to 15% in atomicity ratio.

28. The laser device according to claim 5, wherein the crystal of said laser medium is doped with the laser active ion at the concentration of 2% to 5% in atomicity ratio, whereby an absorption coefficient of the light in the wavelength band of 880 nm is greater than the absorption coefficient of the light in the wavelength band 750 nm.

29. The laser device according to claim 5, wherein the crystal is fabricated by a floating zone method in a growth atmosphere without limits.

* * * * *